US010690267B2

(12) United States Patent
Pisacreta et al.

(10) Patent No.: US 10,690,267 B2
(45) Date of Patent: Jun. 23, 2020

(54) ADJUSTABLE HOLDING ASSEMBLY (71) Applicant: United Technologies Corporation, Farmington, CT (US)

(72) Inventors: Pellegrino J. Pisacreta, Newtown, CT (US); Michael J. Kelly, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/036,628

(22) Filed: Jul. 16, 2018

(65) Prior Publication Data
US 2020/0018427 A1   Jan. 16, 2020

(51) Int. Cl.
F16L 3/123   (2006.01)
H02G 3/32   (2006.01)
B64C 1/40   (2006.01)

(52) U.S. Cl.
CPC ............. F16L 3/123 (2013.01); H02G 3/32 (2013.01); B64C 1/406 (2013.01)

(58) Field of Classification Search
CPC ............ F16L 3/123; H02G 3/32; B64C 1/406
USPC .................. 248/74.3, 554, 555, 556, 557
See application file for complete search history.

(56) References Cited

U.S. PATENT DOCUMENTS

| 2,409,772 | A | 10/1946 | Lund |
| 3,632,071 | A | 1/1972 | Cameron et al. |
| 4,338,707 | A * | 7/1982 | Byerly ............... F16L 3/1008 24/20 LS |
| 4,379,537 | A | 4/1983 | Perrault et al. |
| 4,854,015 | A | 8/1989 | Shaull |
| 5,390,883 | A | 2/1995 | Songhurst |
| 5,673,889 | A * | 10/1997 | DeValcourt ............. B60R 9/08 224/319 |
| 6,394,399 | B2 | 5/2002 | Siegmund |
| 6,683,258 | B1 | 1/2004 | Tracy et al. |
| 7,497,718 | B2 | 3/2009 | Nix et al. |
| 8,235,345 | B2 * | 8/2012 | Sadil ..................... F02K 3/10 244/118.6 |
| 9,062,801 | B2 | 6/2015 | Billarant et al. |

(Continued)

FOREIGN PATENT DOCUMENTS

DE   10010933 C1   8/2001
EP   2908039 A1   12/2014

(Continued)

OTHER PUBLICATIONS

Extended European Search Report for European Application No. 19186294.5; dated Jan. 2, 2020; Date of Completion: Dec. 12, 2019; 82 Pages.

Primary Examiner — Muhammad Ijaz
(74) Attorney, Agent, or Firm — Cantor Colburn LLP (57) ABSTRACT A mounting assembly for restricting movement of an electrical harness of a gas turbine engine includes a base, a first channel formed in the base and extending between a first surface and a second surface of the base, and a second channel formed in the base and extending between the first surface and a third surface of the base. The second surface and the third surface are distinct. At least one flexible connector is receivable within the first channel and the second channel. At least a portion of the at least one flexible connector extends about the electrical harness to couple the electrical harness to the base.

17 Claims, 7 Drawing Sheets (56) References Cited

U.S. PATENT DOCUMENTS

| | | |
|---|---|---|
| 9,509,129 B2 | 11/2016 | Thomas |
| 2002/0117321 A1 | 8/2002 | Beebe et al. |
| 2012/0080566 A1 | 4/2012 | Pauchet et al. |
| 2013/0161093 A1* | 6/2013 | Broughton ............... H05K 1/18 174/72 A |
| 2014/0050571 A1 | 2/2014 | Sauerhoefer et al. |
| 2014/0208712 A1* | 7/2014 | Dowdell .................. A62C 3/16 60/39.091 |
| 2015/0021455 A1* | 1/2015 | Mandel .................... F02C 7/32 248/554 |
| 2015/0342022 A1* | 11/2015 | Willmot .................. H05K 3/46 174/250 |
| 2020/0018427 A1* | 1/2020 | Pisacreta ................. H02G 3/32 |

FOREIGN PATENT DOCUMENTS

| | | |
|---|---|---|
| GB | 1525801 A | 9/1978 |
| WO | 2014193351 A1 | 12/2014 |

\* cited by examiner

FIG. 7

ADJUSTABLE HOLDING ASSEMBLY

BACKGROUND

Embodiments of the present disclosure pertain to the art of fasteners, and more specifically, to a fastener for use with an electrical harness of an engine.

Positioned about the external surface of an engine is at least one electric cable assembly, commonly referred to as an electrical harness. These electrical harnesses are used to supply electricity to various pieces of peripheral equipment of the engine, such as sensors, computer controls and actuators for example. Each electrical harness is handmade and has a diameter and stiffness based on a given application of the harness. Accordingly, there is commonly significant variation between harnesses within a single engine.

Each engine harness is generally held in place by supports, brackets, and spring clips spaced at intervals over the length of the harness. In current systems, a spring clip is hard mounted to a custom mounting bracket for attachment to the harness. However, changes in position or size cannot be accommodated without a complete redesign. Accordingly, there is a need for an assembly for mounting an electrical harness that can be easily adapted for use with various configurations of an electrical harness and engine.

BRIEF DESCRIPTION

According to an embodiment, a mounting assembly for restricting movement of an electrical harness of a gas turbine engine includes a base, a first channel formed in the base and extending between a first surface and a second surface of the base, and a second channel formed in the base and extending between the first surface and a third surface of the base. The second surface and the third surface are distinct. At least one flexible connector is receivable within the first channel and the second channel. At least a portion of the at least one flexible connector extends about the electrical harness to couple the electrical harness to the base.

In addition to one or more of the features described above, or as an alternative, in further embodiments the first channel is located adjacent a first side of the base and the second channel is positioned adjacent a second side of the base.

In addition to one or more of the features described above, or as an alternative, in further embodiments the first channel extends from an upper surface of the base to a first side surface of the base and the second channel extends from the upper surface of the base to a second side surface of the base.

In addition to one or more of the features described above, or as an alternative, in further embodiments the first side surface is disposed opposite the second side surface.

In addition to one or more of the features described above, or as an alternative, in further embodiments the at least one flexible connector includes a first end and a second end, at least one of the first end and the second end being affixed within one of the first channel and the second channel.

In addition to one or more of the features described above, or as an alternative, in further embodiments the at least one flexible connector includes a single flexible connector, the first end of the single flexible connector being affixed within the first channel and the second end of the single flexible connector being affixed within the second channel.

In addition to one or more of the features described above, or as an alternative, in further embodiments the at least one flexible connector includes a first flexible connector and a second flexible connector, a first end of the first flexible connector being affixed within the first channel and a first end of the second flexible connector being affixed within the second channel.

In addition to one or more of the features described above, or as an alternative, in further embodiments a second end of the first flexible connector is coupleable to a second end of the second flexible connector to couple the electrical harness to the base.

In addition to one or more of the features described above, or as an alternative, in further embodiments the second end of the first connector is coupleable to the second end of the second flexible connector via a hook and loop-type attachment.

In addition to one or more of the features described above, or as an alternative, in further embodiments a tab is formed at a second end of at least one of the first flexible connector and the second flexible connector.

In addition to one or more of the features described above, or as an alternative, in further embodiments the at least one flexible connector includes a single flexible connector having a first end and a second end, the first end being extendable through the first channel and the second end being extendable through the second channel.

In addition to one or more of the features described above, or as an alternative, in further embodiments the first end is connectable to the second end to couple the electrical harness to the base.

In addition to one or more of the features described above, or as an alternative, in further embodiments the first end is coupleable to the second end via a hook and loop-type attachment.

In addition to one or more of the features described above, or as an alternative, in further embodiments a force applied by the at least one connector to the electrical harness is adjustable.

According to another embodiment, a gas turbine engine includes a mounting surface, an electrical harness, and a mounting assembly for affixing the electrical harness to the mounting surface at a location. The mounting assembly includes a base connected to the mounting surface, a first channel formed in the base and extending between a first surface and a second surface of the base, and a second channel formed in the base and extending between the first surface and a third surface of the base. The second surface and the third surface are distinct. At least one flexible connector is receivable within the first channel and the second channel and at least a portion of the at least one flexible connector extends about the electrical harness to couple the electrical harness to the base.

In addition to one or more of the features described above, or as an alternative, in further embodiments the engine further comprises a casing and the mounting surface is an exterior surface of the casing.

In addition to one or more of the features described above, or as an alternative, in further embodiments the engine is an aircraft engine.

According to another embodiment, a method of restricting movement of an electrical harness relative to a gas turbine engine includes positioning the electrical harness in contact with a base of a mounting assembly and wrapping at least one flexible connector about the electrical harness. The at least one flexible connector extends through a first channel and a second channel formed in the base. The first channel is formed between a first surface and a second surface of the base and the second channel is formed between a first surface and a third surface of the base. The second surface and the third surface are distinct. The method additionally includes restricting movement of the at least one flexible connector relative to the base.

In addition to one or more of the features described above, or as an alternative, in further embodiments the at least one flexible connector includes affixing a first end of the at least one flexible connector to a second end of the at least one flexible connector.

In addition to one or more of the features described above, or as an alternative, in further embodiments restricting movement of the at least one flexible connector relative to the base includes affixing an end of the at least one flexible connector to the base.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
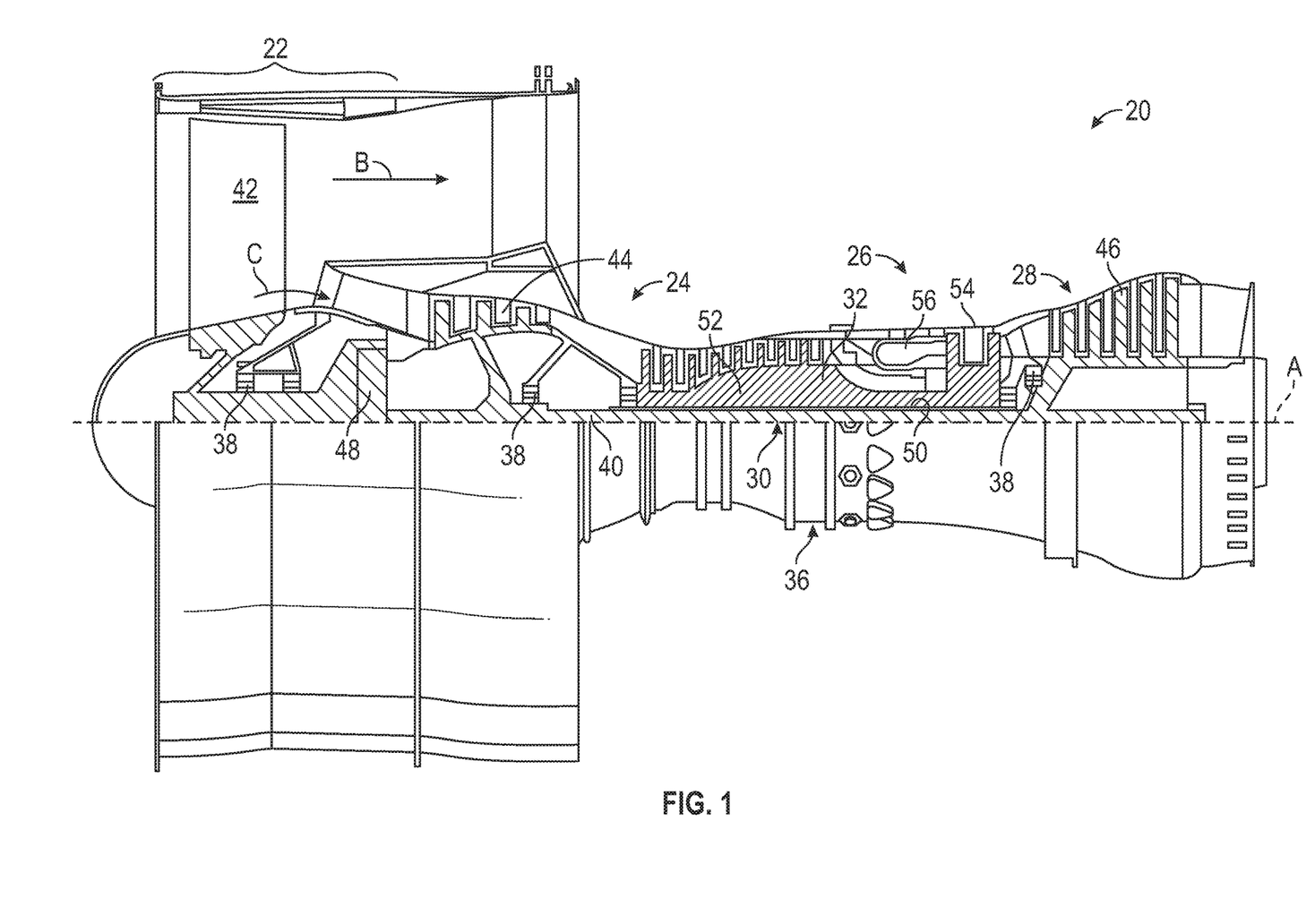
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

Figure 2:
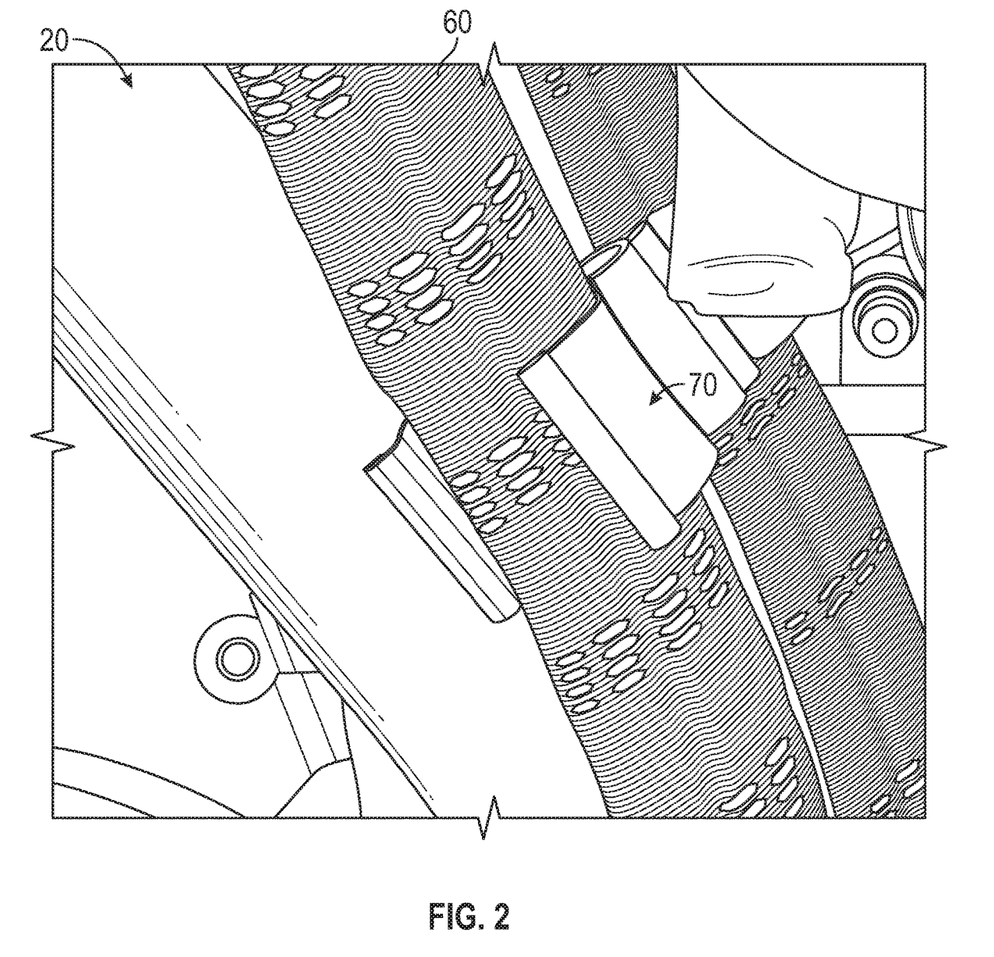
FIG. 2 is perspective view of an electrical harness positioned about an exterior of a portion of an engine.

With reference now to FIG. 2, one or more electrical harnesses 60 are typically laid about the periphery of an exterior of a casing or housing of the engine 20. These electrical harnesses 60 are configured to supply power to the various portions of the engine 20 or to electrical components or subsystems associated therewith. These harnesses 60 are typically held in place by one or more mounting assemblies 70 disposed at various locations along the length of the electrical harness 60 and engine 20.

Referring now to FIGS. 3-7, an example of a mounting assembly 70 for supporting an electrical harness 60 at a desired location is illustrated. As shown, the mounting assembly 70 includes a base 72 and one or more flexible connectors 86, such as straps for example, configured to cooperate with the base 72 to restrict movement of an electrical harness 60 relative to the mounting assembly 70. The material used to form the base 72 may be selected based on the environment of the engine 20 and one or more requirements associated with the specific area within which the mounting assembly 70 is located. The base 72 may be formed from any suitable material including, but not limited to Teflon, PEEK, and metal for example. In embodiments where the base 72 is formed from a plastic material, the base 72 may be injection molded.

In the illustrated, non-limiting embodiment, the base 72 of the mounting assembly 70 is generally rectangular in shape and has a generally rectangular cross-section taken along either a first axis X, or a second axis Y, oriented substantially perpendicular to the first axis X and generally parallel to an axis defined by the electrical harness 60. However, it should be understood that a base 72 having another shape is also considered within the scope of the disclosure.

One or more channels 74 may be formed in the base 72. In the illustrated non-limiting embodiment, a first channel 74a is located adjacent a first side of the base 72 and a second channel 74b is located adjacent a second, opposite side of the base 72. As shown, each of the first and second channels 74a, 74b extends from an upper surface 76 of the base 72 to either the first or second side surface 78, 80 of the base 72, respectively. Although the first channel 74a and the second channel 74b are illustrated as being aligned, in other embodiments, the first channel 74a and the second channel 74b may be axially offset from one another about at least one of the first and second axis X, Y. In addition, it should be understood that the one or more channels 74 illustrated and described herein are intended as an example only, and that a base of a mounting assembly 70 having any suitable number of channels 74 having any size, shape, and location are within the scope of the disclosure.

Figure 4A:
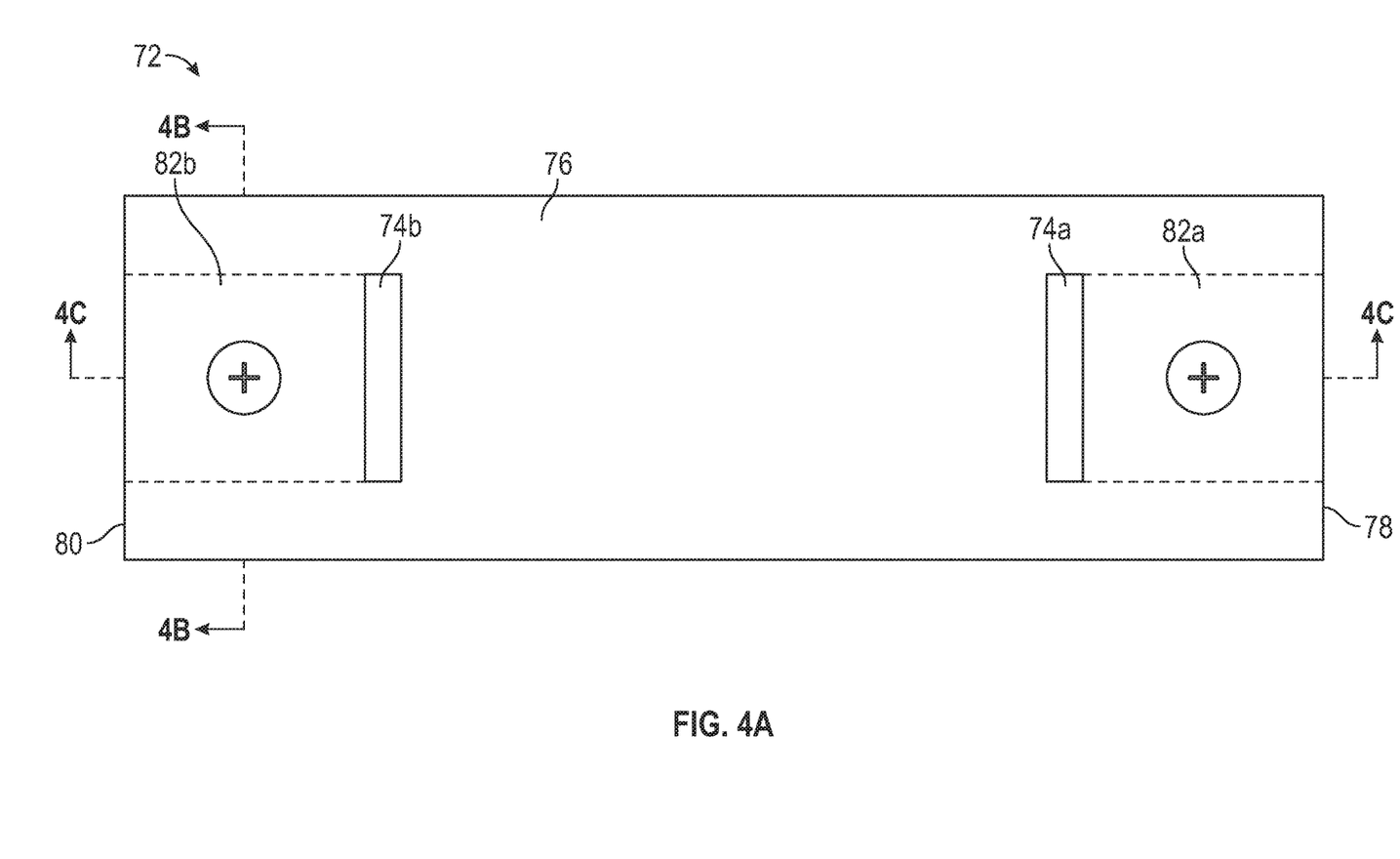
FIG. 4A is a plan view of a base of the module assembly according to an embodiment.
Figure 4B:
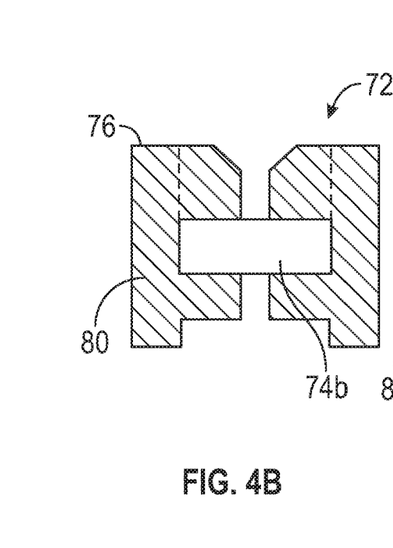
FIG. 4B is a cross-sectional view of the base of a module assembly of FIG. 4A taken along line Y-Y according to an embodiment.
Figure 4C:
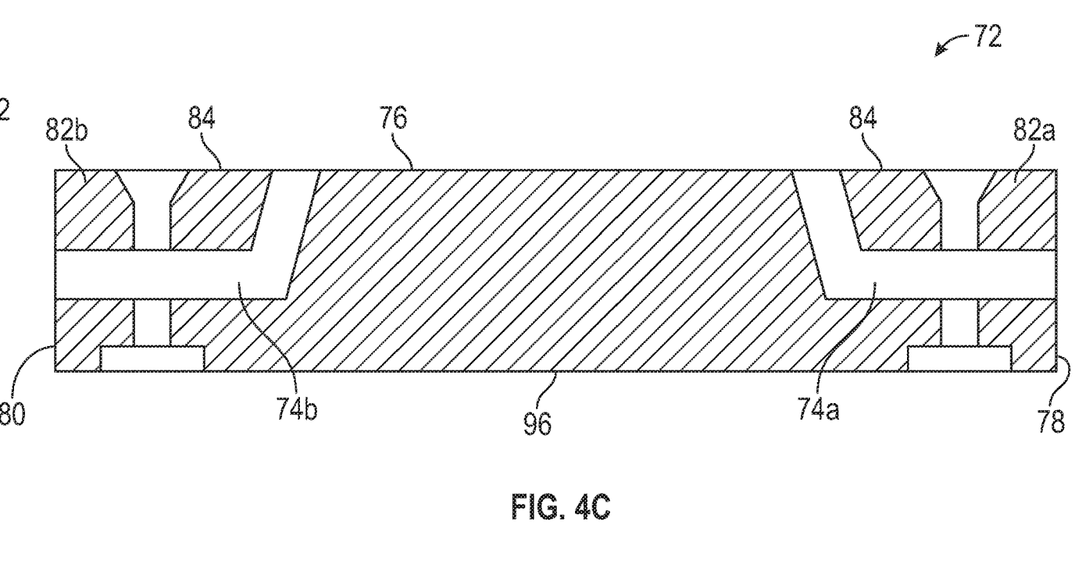
FIG. 4C is a cross-sectional view of the base of a module assembly of FIG. 4A taken along line X-X according to an embodiment.
Figure 6:
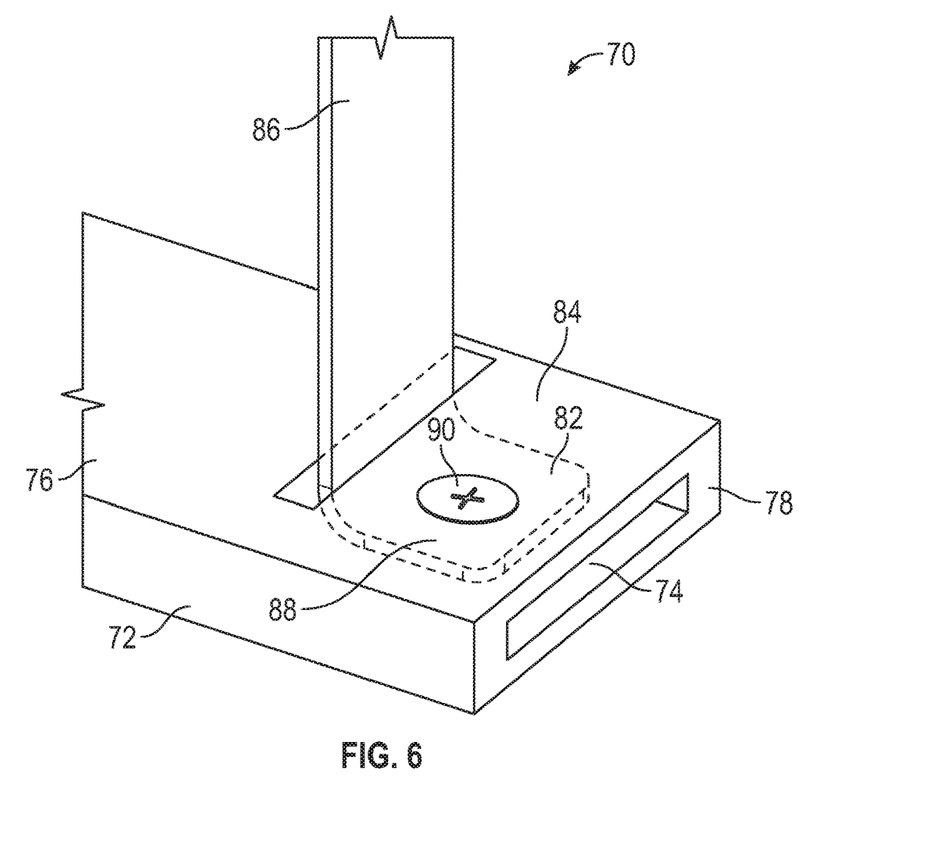
FIG. 6 is a perspective end view of the module assembly according to an embodiment.
Figure 7:
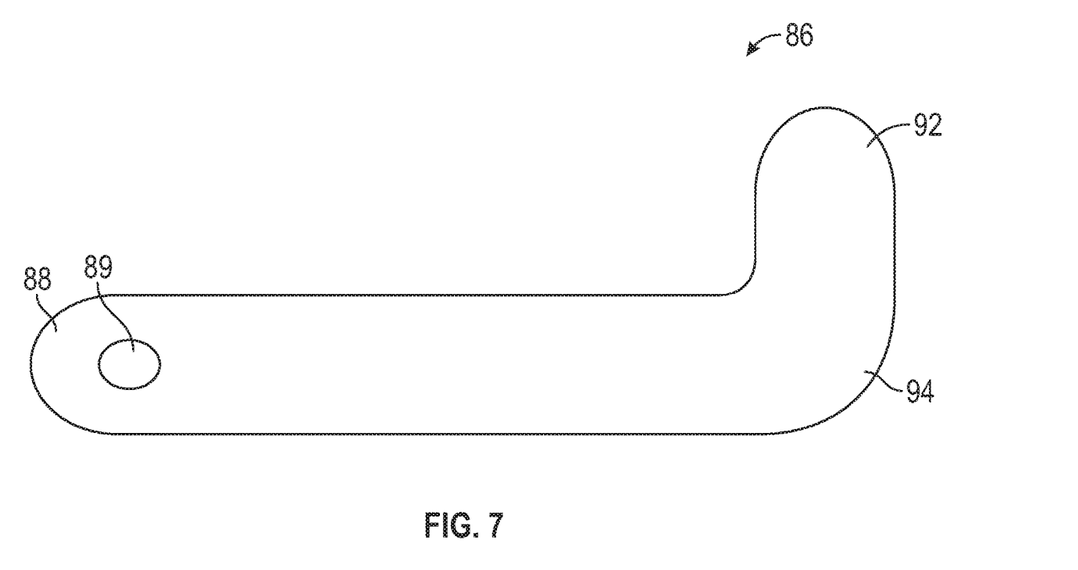
FIG. 7 is a plan view of a flexible connector of the module assembly according to an embodiment.

In an embodiment, the base 72 includes a portion 82 located vertically upward of the one or more channels 74. This portion 82 may be referred to herein as a cover and cooperates with the remainder of the base 72 to define at least a portion of the channel 74. As shown, the upper surface 84 of the cover 82 may be generally flush with the upper surface 76 of the remainder of the base 72. In embodiments of the mounting assembly 70 including both a first channel 74a and a second channel 74b, the base 72 may include a first cover 82a disposed upwardly adjacent the first channel 74a and a second cover 82b disposed upwardly adjacent the second channel 74b. As best shown in FIGS. 4A-4C, the one or more covers 82a, 82b may be movable relative to the remainder of the base 72, or in some embodiments removable from the remainder of the base 72, to provide access to a corresponding channel 74a, 74b. Alternatively, the one or more covers 82a, 82b may be affixed to or integrally formed with the base 72, as shown in FIG. 6. In yet another embodiment, the base 72 need not include a cover 82 arranged vertically above the channel 74. In such embodiments, an upper surface of the channel 74 is not defined.

As previously suggested, the mounting assembly 70 additionally includes one or more flexible connectors or straps 86 configured to wrap at least partially about the circumference of the electrical harness 60 to secure the electrical harness 60 to the base 72. An example of a flexible connector 86 is illustrated in more detail in FIG. 7. The flexible connector 86 shown includes a first end 88 receivable within a corresponding channel formed in the base 72. A mounting hole 89 may be formed in the flexible connector 86 near the first end 88 such that when the first end 88 is installed within a corresponding channel 74 of the base 72, a fastener 90 may extend through the base 72 and the mounting hole 89 to couple the flexible connector 86 to the base 72. In an embodiment, a protrusion 92 may extend from second end 94 of the flexible connector 86 at an angle, such as perpendicular for example, to the body of the flexible connector 86. The flexible connector 86 may be formed from any suitable non-rigid material. In an embodiment, the flexible connector 86 may be formed from PEEK, TEFZEL, Teflon, Metal, or any other suitable material that meets the engine requirements at a given location. In an embodiment, the flexible connector 86 may be formed form an encapsulated material.

Figure 3:
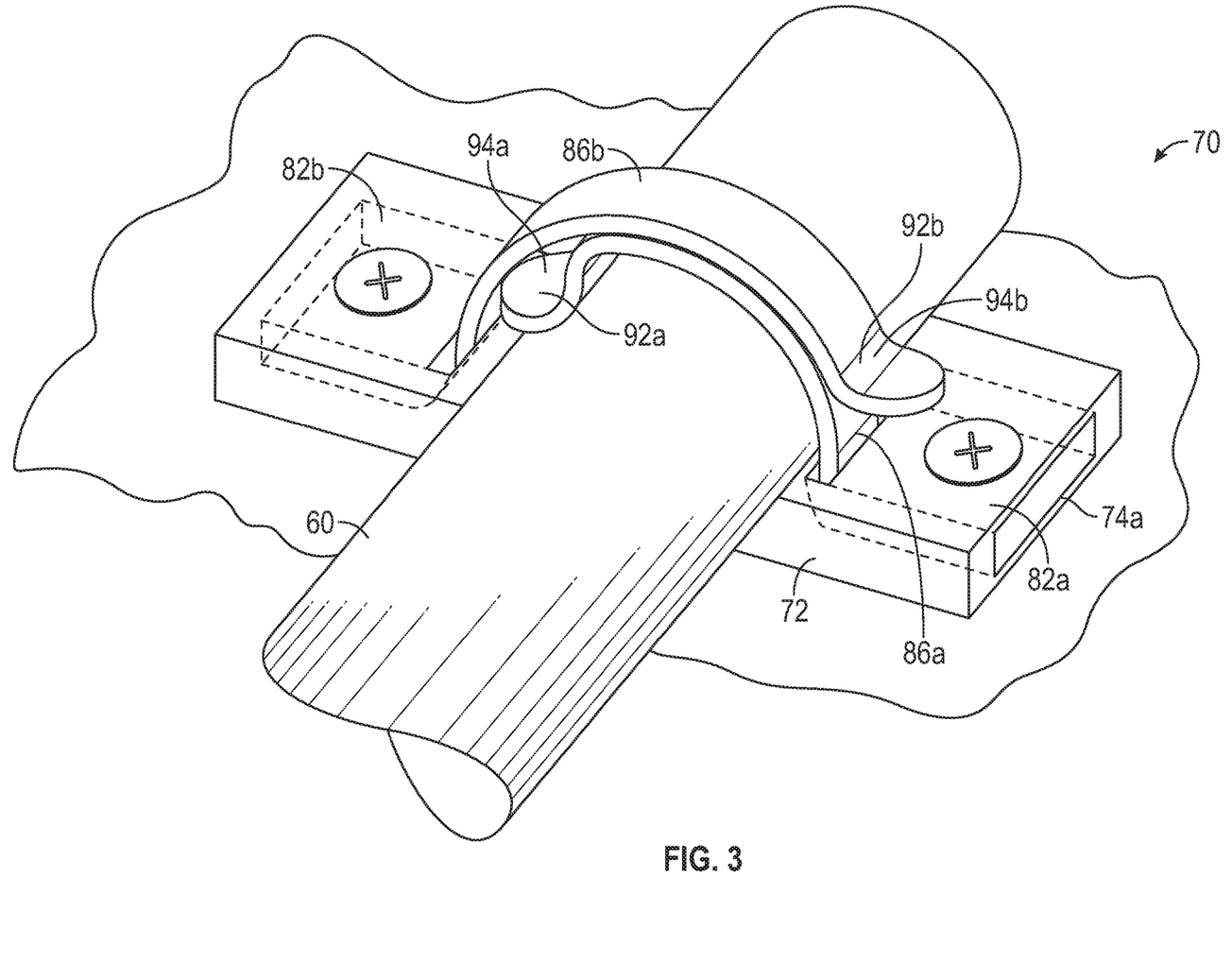
FIG. 3 is a perspective view of a module assembly for mounting the electrical harness to a surface according to an embodiment.
Figure 5:
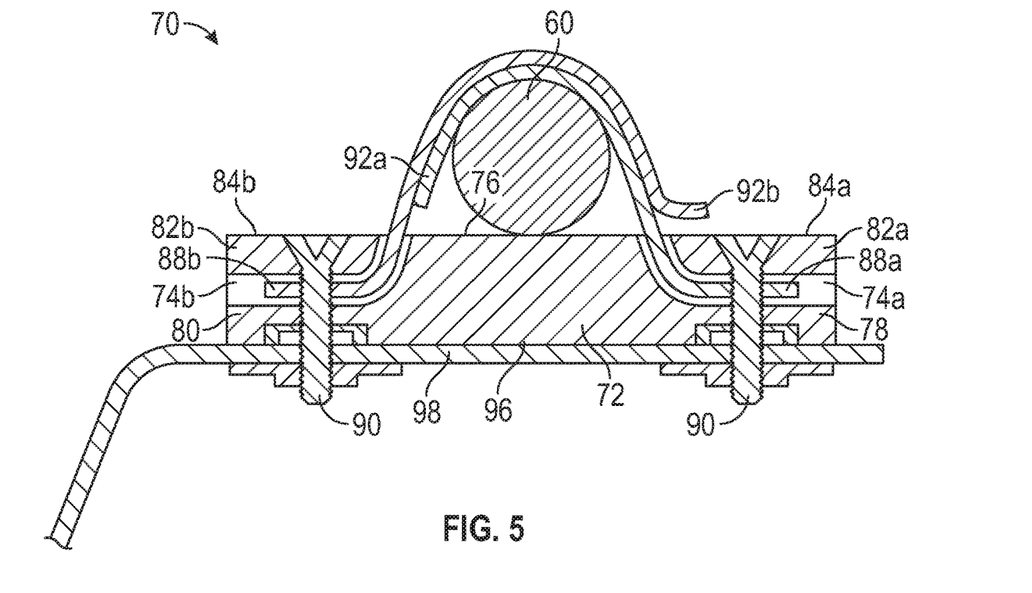
FIG. 5 is a cross-sectional view of the module assembly having an electrical harness coupled thereto according to an embodiment.

With respect to the embodiment of the module assembly 70 illustrated in FIG. 3 and FIG. 5, the assembly 70 includes a first flexible connector 86a associated with the first channel 74a and a second flexible connector 86b associated with the second channel 74b. As shown, the first end 88a of the first flexible connector 86a is arranged within the first channel 74a and secured to the base 72 by a first fastener 90 and a first end 88b of the second flexible connector 86b is arranged within the second channel 74b and secured to the base 72 by a second fastener 90. Although a fastener, such as a screw or bolt is shown, it should be understood that any suitable connector or fastening mechanism may be used to retain the first ends 88a, 88b of the flexible connector 86a, 86b relative to the base 72.

The free second end 94a, 94b of the first flexible connector 86a and the second flexible connector 86b are positionable about an exterior surface of the electrical harness 60. The first flexible connector 86a and the second flexible connector 86b extend at an angle to the axis of the harness 60. In an embodiment, the straps 86a, 86b are elongated such that the second ends 94a, 94b of the flexible connectors 86a, 86b are configured to overlap one another about the body of the electrical harness 60. In such embodiments, the straps 86a, 86b may be configured to affix or couple to one another, as shown in FIG. 5, such as via Velcro, a hook and loop fastening system, or any other suitable connection mechanism. Inclusion of the protrusion 92a, 92b at the second end 94 of each flexible connector 86a, 86b, allows a user to easily maneuver and apply a desired force to the flexible connector 86a, 86b to secure the harness 60 to the module assembly 70.

Alternatively, the second end 94a, 94b of each flexible connector 86a, 86b may be configured to couple to an opposite side of the base 72, such that the first end 88a, 88b of each flexible connector 86a, 86b is connected to the base 72 adjacent a first side of the electrical harness 60 and a second end 92a, 92b of the flexible connector 86a, 86b is coupled to the base 72 adjacent a second, opposite side of the electrical harness 60. In such embodiments, any suitable connection mechanism (not shown) may used to secure the free second end of each flexible connector 86 to the base 72.

In another embodiment, the mounting assembly 70 includes a single flexible connector 86. In such embodiments, the flexible connector 86, may, but need not include one or more mounting holes 89 and a protrusion 92 located at either end 88, 94 thereof. For example, in embodiments of the mounting assembly 70 including a single flexible connector 86, a portion of the flexible connector 86 may wrap about a lower surface 96 of the base 72. In instances where the lower surface 96 of the base 72 is mounted to another component 98, such as shown in FIG. 5 for example, the single strap 86 may be received within a channel or groove (not shown) formed in the lower surface 96 so as not to interfere with the connection between the base 72 and the another component 98. The first end 88 of the strap 86 may extend through the first channel 74a and the second end 92 of the strap 86 may extend through the second channel 74b to wrap about the electrical harness 60. As previously described, the first and second end 88, 94 of the flexible connector 86 may couple to one another, or to a portion of the base 72.

In yet another embodiment, a first end 88 of the single flexible connector 86 may be affixed to a portion of the base 72, such as within the first channel 74a for example. A free, second end 94 of the flexible connector 86 is configured to wrap about the electrical harness 60 before being affixed or coupled to the base 72, such as within the second channel 74b for example. In an embodiment, a position of one or both of the first end 88 and the second end 94 of the flexible connector 86 is movable relative to the base 72 to control the pressure applied by the flexible connector 86 to the electrical harness 60. Regardless of the configuration of the one or more flexible connectors 86 of the mounting assembly 70, the connection between the at least one flexible connector 86 and the base 72 and/or the connection between the straps 86 may be adjustable such that the mounting assembly 70 is suitable for use with a variety of electrical harnesses of different sizes.

The mounting assembly 70 as illustrated and described herein is suitable for use an electrical harness 60 having various configurations of size and shape. Further, because the strap 86 is formed from a fabric or plastic material, rather than a metal, potential chafing between the harness 60 and the mounting assembly 70 is eliminated. Further, in embodiments where sever mounting assemblies 70 are used to secure an electrical harness at various locations about an engine, the plurality of mounting assemblies 70 may be substantially identical, or may be different. For example, one or more components of the mounting assembly 70 may be formed from different materials depending on the position of the mounting assembly 70 relative to the engine 20.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A mounting assembly for restricting movement of an electrical harness of a gas turbine engine, comprising:
   a base;
   a first channel formed in the base and extending between a first surface and a second surface of the base;
   a second channel formed in the base and extending between the first surface and a third surface of the base, the second surface and the third surface being distinct; and
   at least one connector receivable within the first channel and the second channel, wherein at least a portion of the at least one connector operable to retain and conform to the shape of an electrical harness to the base, a first end of the at least one connector being fastened to the base within the first channel by a first fastener and a second end of the at least one connector being fastened to the base within the second channel by a second fastener.

2. The mounting assembly of claim 1, wherein the first channel is located adjacent a first side of the base and the second channel is positioned adjacent a second side of the base.

3. The mounting assembly of claim 1, wherein the first channel extends from an upper surface of the base to a first side surface of the base and the second channel extends from the upper surface of the base to a second side surface of the base.

4. The mounting assembly of claim 3, wherein the first side surface is disposed opposite the second side surface.

5. The mounting assembly of claim 1, wherein the at least one connector is a single connector.

6. The mounting assembly of claim 1, wherein the at least one connector includes a first connector and a second connector, wherein the first end of the at least one connector is a first end of the first connector being affixed within the first channel and wherein the first end of the at least one connector is a first end of the second connector being affixed within the second channel.

7. The mounting assembly of claim 6, wherein a second end of the first connector is coupleable to a second end of the second connector to couple the electrical harness to the base.

8. The mounting assembly of claim 7, wherein the second end of the first connector is coupleable to the second end of the second connector via a hook and loop-type attachment.

9. The mounting assembly of claim 6, wherein a tab is formed at the second end of at least one of the first connector and the second connector.

10. The mounting assembly of claim 1, wherein the at least one connector includes a single connector having a first end and a second end, the first end being extendable through the first channel and the second end being extendable through the second channel.

11. The mounting assembly of claim 10, wherein the first end is connectable to the second end to couple the electrical harness to the base.

12. The mounting assembly of claim 11, wherein the first end is coupleable to the second end via a hook and loop-type attachment.

13. The mounting assembly of claim 1, wherein a force applied by the at least one connector to the electrical harness is adjustable.

14. The mounting assembly of claim 1, wherein the at least one connector defines a body joined with and perpendicular to the first end, and the first end defines a mounting hole sized to receive the first fastener.

15. A gas turbine engine comprising:
a mounting surface;
an electrical harness;
a mounting assembly for affixing the electrical harness to the mounting surface at a location, the mounting assembly including:
a base connected to the mounting surface;
a first channel formed in the base and extending between a first surface and a second surface of the base;
a second channel formed in the base and extending between the first surface and a third surface of the base, the second surface and the third surface being distinct; and
at least one connector receivable within the first channel and the second channel, wherein at least a portion of the at least one connector extends about the electrical harness to couple the electrical harness to the base, a first end of the at least one connector being fastened to the base within the first channel by a first fastener and a second end of the at least one connector being fastened to the base within the second channel by a second fastener.

16. The gas turbine engine of claim 15, wherein the gas turbine engine further comprises a casing and the mounting surface is an exterior surface of the casing.

17. The gas turbine engine of claim 15, wherein the at least one connector defines a body joined with and perpendicular to the first end, and the first end and the mounting surface define respective mounting holes sized to receive the first fastener.

* * * * *